United States Patent [19]

Knecht et al.

[11] Patent Number: 4,787,704
[45] Date of Patent: Nov. 29, 1988

[54] REMATABLE OPTICAL SPLICE UTILIZING RODS WITH RESILIENT COATING

[75] Inventors: Dennis M. Knecht; David L. Dean, both of Hickory, N.C.

[73] Assignee: Siecor Corporation, Hickory, N.C.

[21] Appl. No.: 80,239

[22] Filed: Jul. 27, 1987

Related U.S. Application Data

[63] Continuation-in-part of Ser. No. 933,875, Nov. 24, 1986, abandoned.

[51] Int. Cl.$^4$ .............................................. G02B 7/26
[52] U.S. Cl. ............................... 350/96.21; 350/96.20
[58] Field of Search ................ 350/96.2, 96.21, 96.22, 350/96.23

[56] References Cited

U.S. PATENT DOCUMENTS

| | | | |
|---|---|---|---|
| 4,046,454 | 9/1977 | Pugh | 350/96 C |
| 4,047,796 | 9/1977 | Kao et al. | 350/96 C |
| 4,096,454 | 9/1977 | Pugh | 350/96.21 |
| 4,118,100 | 10/1978 | Goell et al. | 350/96.20 |
| 4,179,186 | 12/1979 | Tynes | 350/96.21 |
| 4,192,575 | 3/1980 | Hodge | 350/96.21 |
| 4,214,812 | 7/1980 | de Mendez | 350/96.21 |
| 4,227,951 | 10/1980 | Mignien | 350/96.21 |
| 4,261,774 | 4/1981 | Lewis et al. | 350/96.21 |
| 4,390,237 | 6/1983 | Marazzi | 350/96.20 |
| 4,506,946 | 3/1985 | Hodge | 350/96.20 |
| 4,669,820 | 6/1987 | Ten Barge | 350/96.21 |
| 4,714,316 | 12/1987 | Moore et al. | 350/96.23 |

OTHER PUBLICATIONS

"Super-Precision Plug Ferrule"—6 pages, Nissho Iwai American Corporation.
"FC Multi-Mode Connector"—4 pages, Seiko Instruments & Electronics, Ltd.

*Primary Examiner*—Stanley D. Miller
*Assistant Examiner*—Timothy P. Callahan
*Attorney, Agent, or Firm*—Roy B. Moffitt

[57] ABSTRACT

A first embodiment of an optical splice having a frame with a channel; two rods each having a resilient exterior surface disposed in the channel; and a lid adapted to be received on the frame over the channel, the lid having a resilient surface adapted to allow compression of optical fibers placed end to end for splicing between the rods by the lid and the rods. The frame and lid are placed within a tubular housing and a tubular sleeve which is attached at the ends following insertion of the optical fibers. An additional embodiment of an optical splice contains first tube, a ferrule and an optical fiber, the optical fiber having first and second portions, the optical fiber first portion disposed inside of and affixed to the ferrule and the optical fiber second portion lying outside of the ferrule and inside of the first tube and a portion of the ferrule disposed inside of and affixed to the first tube; an alignment device and a second tube, both of which are disposed in the first tube; another optical fiber having a terminal end portion, the terminal end portion disposed in the second tube and said alignment device; and, a housing-coupling device affixed to the first tube, the housing-coupling device adapted to be removably coupled to a receiving device.

34 Claims, 8 Drawing Sheets

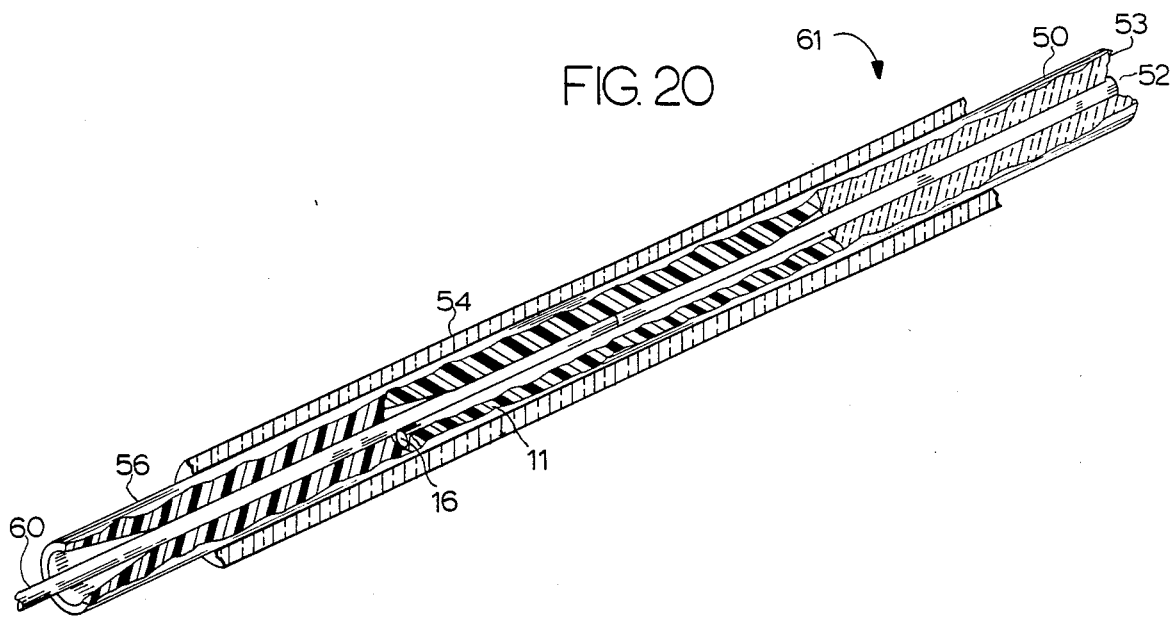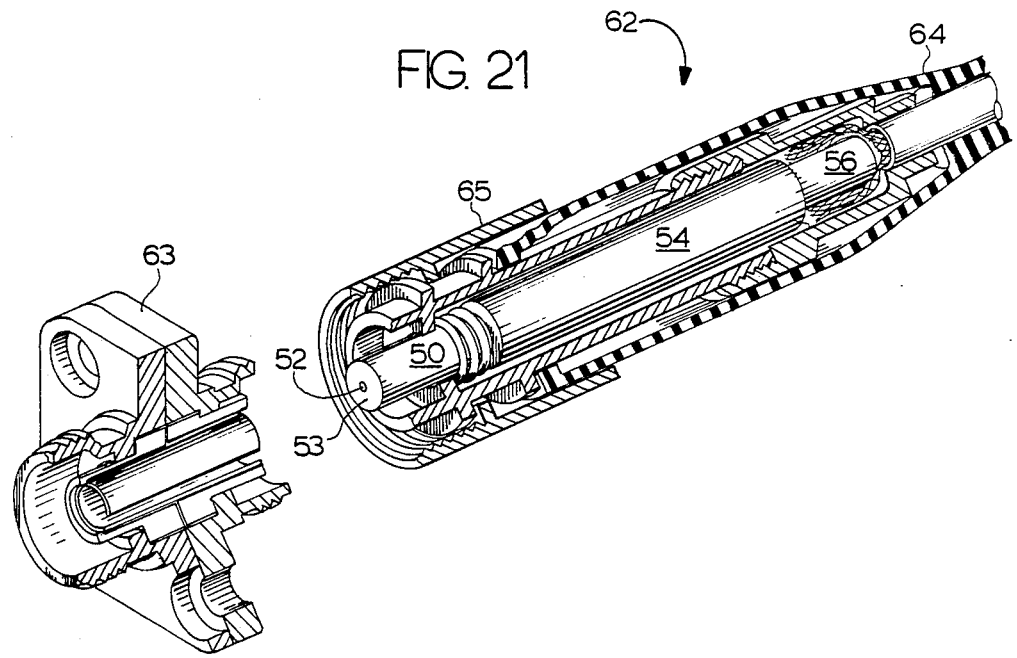

REMATABLE OPTICAL SPLICE UTILIZING RODS WITH RESILIENT COATING

RELATED APPLICATIONS

This is a Preliminary Amendment to create a continuation-in-part of application Ser. No. 933,875, filed Nov. 24, 1986, for REMATABLE OPTICAL SPLICE UTILIZING RODS, now abandoned.

BACKGROUND OF THE INVENTION

This invention relates to optical fiber splicing.

DESCRIPTION OF THE RELATED ART

U.S. Pat. No. 4,046,454 to W. E. Pugh, III, issued Sept. 6, 1977, incorporated by reference herein as if fully set out, discloses an optical fiber connector in which the fibers rest within a V-groove which may have a resilient surface, and is covered by a resilient planar surface or another resilient V-groove. This arrangement is used to accommodate optical fibers having varied outer diameters. The V-grooves in the array have the same shape. Centering the outer diameters of optical fibers tends to result in better alignment of their inner cores.

U.S. Pat. No. 4,047,796 to Charles K. Kao, issued Sept. 13, 1977, incorporated hereby by reference as if fully set out, discloses an optical fiber connector in which the fiber is compressed by two rods and a plate surrounding the fiber.

SUMMARY OF THE INVENTION

The splice of the present invention includes a frame having a channel in lengthwise communication with an exterior surface of the frame, two rigid coated rods beside each other in the channel delimiting a groove therebetween into which two optical fiber terminal end portions may be abutted, each rod having a resilient lengthwise coating between 0.0015 and 0.004 inches thick, and a lid at least partially covered by a resilient coating between 0.0015 and 0.010 inches thick, said lid coating adapted to be in lengthwise contact with the two rigid coated rods when the lip is closed. In use, two optical fiber terminal end portions are disposed in the groove delimited by the coated rods, the optical fibers being in end wise abutting relationship with each other. A recess or recesses may be formed in the lid coaxial with the groove to facilitate placement of the optical fiber or optical fibers. The rods may be glass rods, or in fact, other optical fibers. The preferred ratio between the diameter of the coated rods and the diameter of the optical fibers to be spliced is preferably 4:1.

To facilitate use of the invention, a device is needed to compress the frame and lid into a mating relationship, closing the lid. This compression will center the optical fibers as is shown to be desirable in the prior art. This device includes a housing longer than the frame and the lid placed around the frame and lid with the end portions of the housing extending beyond the frame and lid. Resilient tubular members are then nested within the housing on either end of the frame and lid. The inner diameter of the tubular members are preferably equal to the outer diameters of the buffer tubes on the optical fibers to be spliced and the outer diameter of the resilient tubular members are preferably equal to the inner diameter of the housing, which may also be tubular. The end portions of the housing have longitudinal slits. A malleable crimping sleeve is then disposed around the housing and crimped over the end portions of the housing. When crimping occurs, the longitudinal slits may close and any additional pressure may be taken up by the resilient tubular members and the buffer tubes of the optical fibers. The buffer tubes are removed in the portion of the optical fibers covered by the frame and lid. The coated rods are in very close, side-by-side relationship, and may contact one another. In one embodiment, the coated portion of the lid is flat and in a second embodiment, the coated portion of the lid is curved. In either case, pressure from the frame and lid compresses the optical fiber terminal ends within the three resilient surfaces, namely the coated portion of the lid and the coated rods, centering the optical fibers, which may be of different diameter, with each other.

Rods of varying circumferences may be used to adjust for fibers having different outer diameters. A small press or other clamp also may be used to compress the frame and lid, but the embodiment shown is preferred by the inventors. An index matching gel may be placed between the spliced fiber ends to eliminate Fresnel losses.

Applicants believe that variations in thickness of the resilient coatings on the rod and lid cause changes in performance of the splice. If the coating is too thick or too narrow, the temperature and attenuation performance suffer. Testing shows that the resilient coating thickness on the rods and cover should be between 0.0015 inches and 0.004 inches with the ideal coating thickness being in the neighborhood of 0.002 inches. Measurement error is approximately ±0.0002 inches. The following table gives results for rods and a flat lid each having the listed coating thickness:

| Splice Losses in Decibels As a Function of Coating Thickness | |
| --- | --- |
| Coating Thickness (In.) | Relative Splice Loss (db) |
| 0 | 0.7 |
| .0005 | 0.45 |
| .0015 | 0.4 |
| .002 | 0 |
| .004 | 0.4 |

These results show that a rod and lid coating thickness between 0.0015 inches and 0.004 inches is critical because it yields a splice loss (measured in db) less than those experienced using coatings of other thickness. On the other hand, despite the desirable attenuation data observed with the rods and lid both having a coating between 0.0015 and 0.004 inches thick, the same result (desirable attenuation) can also be achieved when the coating of the lid is between 0.0015 and 0.010 inches thick when the rod thickness is kept between the range of 0.0015 and 0.004 inches.

Objects of the invention are to provide a resilient optical fiber splice which can be adjusted by use of rods of varying sizes, a combination of optical fibers of different outer diameters, and ease of removal. Ease of removal encourages interior cleaning of the splice as necessary and promotes its use in areas where change of fibers in the splice, or remating, is anticipated.

The resilient coating on the portion of the lid to be coated may be applied by an adhesive.

BRIEF EXPLANATION OF THE DRAWINGS

FIG. 20 is a partial cutaway perspective of the combination of FIG. 19 with a field inserted optical fiber inserted in the second tube and the alignment device.

FIG. 21 is a perspective cutaway view of the combination of FIG. 20 (element 61) incorporated into a housing-coupling device to form element 62 that is removably affixable to receiving device 63.

DETAILED DESCRIPTION OF THE PREFERRED EMBODIMENTS

Figure 1:
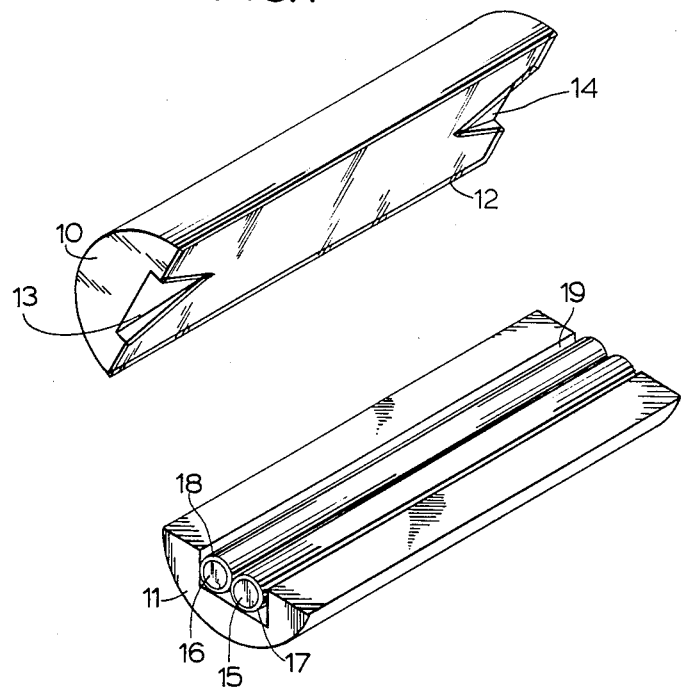
FIG. 1 shows a perspective view of the frame, lid, and rods.

FIG. 1 shows a perspective view of the frame and lid of the first embodiment of the invention. Plastic lid 10 fits over plastic frame 11. Frame 11 contains rectangular channel 19. Resting in channel 19 are glass rod 15, having a resilient coating 17, and glass rod 16, covered by resilient coating 18. Lid 10 has recesses 13 and 14, allowing for easier insertion of optical fibers to be spliced. Lid 10 also has a resilient coating 12, which preferably also coats recesses 13 and 14. Resilient coatings which may be used on the rods and lid include polyurethane, silicone and acrylate.

Figure 2:
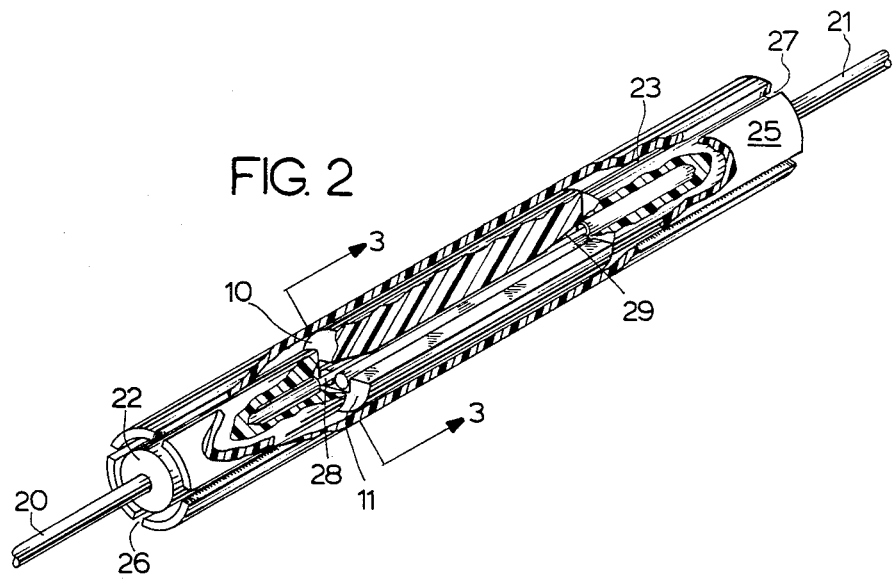
FIG. 2 shows a cutaway or perspective view of the assembled frame and lid surrounded by the tubular housing and resilient tubular members.

FIG. 2 shows a cutaway perspective view of the assembled frame and lid of FIG. 1 during splicing. Optical fiber 28 in buffer tube 20 enters through recess 13 and optical fiber 29 in buffer tube 21 enters through recess 14. The frame and lid are between resilient tubular members 22 and 23, each having an inner diameter suitable to fit around buffer tubes 20 and 21 and preferably an outer diameter matching the outer diameter of assembled frame 10 and 11. The buffer tubes have been removed over the portions of the optical fibers to be spliced within frame 11 and lid 10. Tubular housing 25 is placed over the resilient tubular members 22, 23 and assembled frame 11 and lid 10. Note tubular housing 25 has longitudinal slits such as 26 and 27 therein. These slits come into play during the crimping process explained below.

Figure 3:
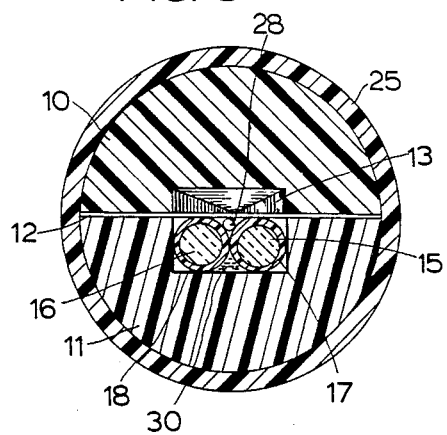
FIG. 3 is a cross sectional view along line 3—3 of FIG. 2.

FIG. 3 is a sectional view along line 3—3 of FIG. 2. This view shows index matching gel 30 which is placed within channel 19 in the space not occupied by the optical fibers and coated rods in order to minimize attenuation losses resulting from the different indexes of refraction of the optical fibers and any air space which may remain between them. Note tubular housing 25 which has been placed around the assembled frame and lid.

Figure 4:
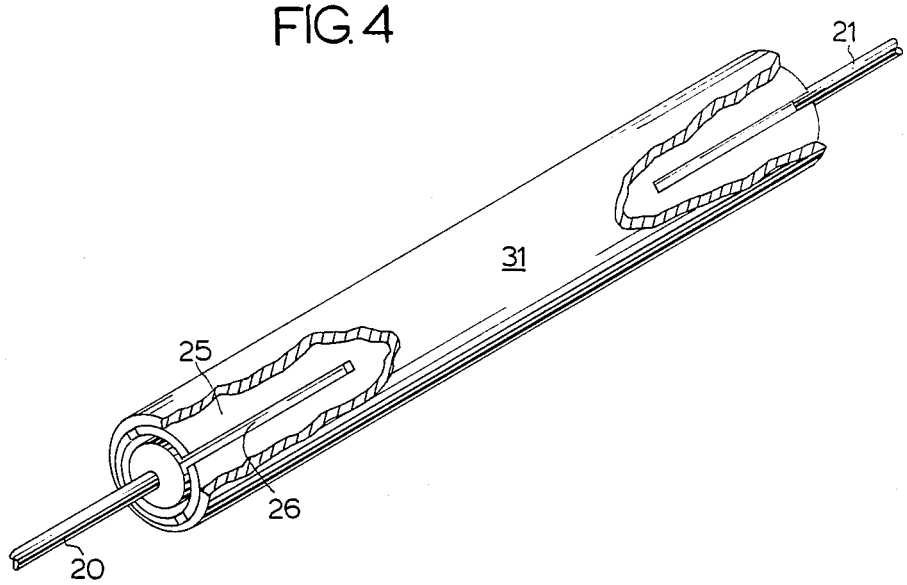
FIG. 4 is a partial cut-a-way perspective view of the assembly covered by the malleable crimping sleeve.

FIG. 4 is basically the same view as that of FIG. 2, except that a malleable copper tubular crimping sleeve 31 has been placed over tubular housing 25.

Figure 5A:
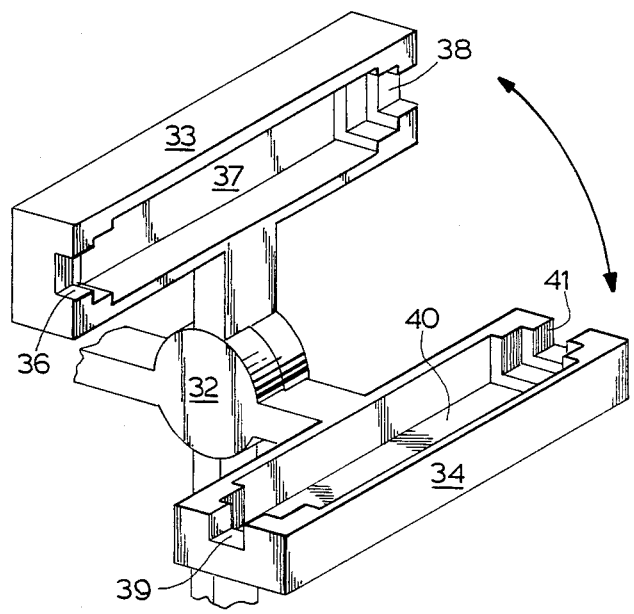
FIG. 5a is a perspective view of one embodiment of a crimping tool.
Figure 5B:
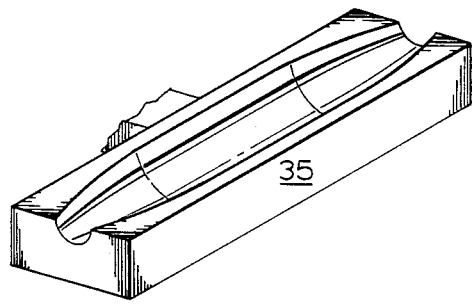
FIG. 5b is a perspective view of another embodiment of a crimping tool.

FIGS. 5a and 5b show two different embodiments which may be used for a crimping tool contemplated by the invention. Jaws 33 and 34 extend from pivot 32. Jaw 33 contains cavity 37 and jaw 34 contains cavity 40. Cavities 37 and 40 have narrower stepped end portions 36, 38 and 39, 41 to allow crimping to take place at the ends of the crimping sleeve, but not in the middle portion. Both jaws may also take the shape of jaw 35 in FIG. 5b, where again the cavity is narrower at the ends of the jaw than in the middle in order to achieve the same purpose.

Figure 6:
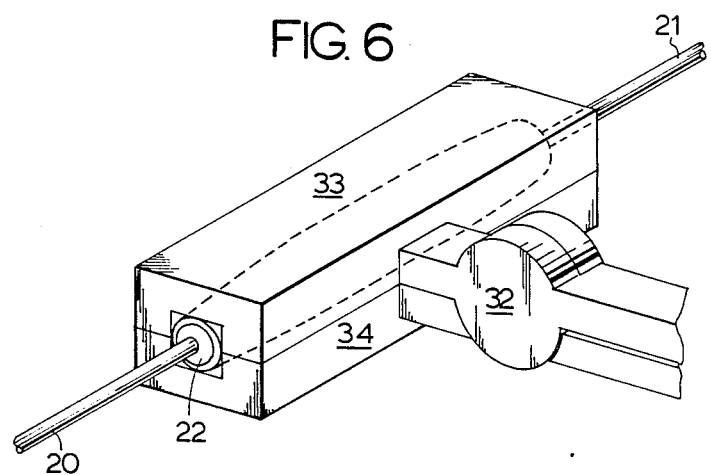
FIG. 6 is a perspective view of the crimping tool in crimping the malleable sleeve of FIG. 4.

FIG. 6 shows the crimping tool in operation. The tool is so designed that the crimping sleeve is crimped at its ends but not in the middle portion. To protect the fragile glass optical fibers, the longitudinal slits in the tubular housing may close and any further forces are absorbed by the resilient tubular members such as 22 and buffer tubes 20 and 21.

Figure 7:
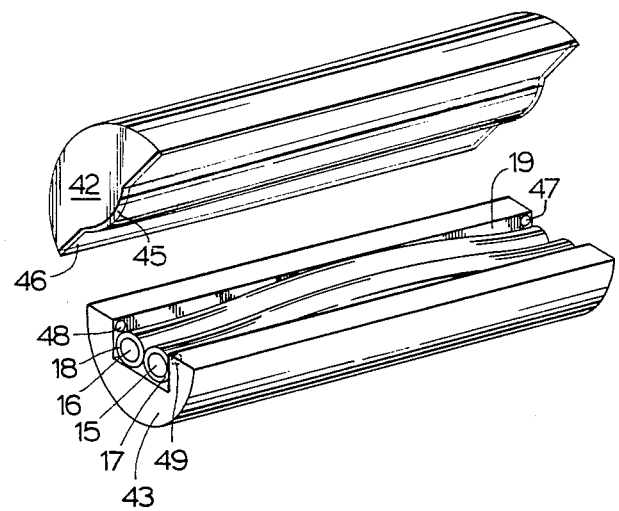
FIG. 7 is a perspective view of a second embodiment of the invention.

FIG. 7 shows the second embodiment of the invention. Here, lid 42 having resilient coating 46 fits over frame 43. In this case, lid 42 has a convex smooth protuberance 45. Also note that channel 19 in frame 43 is deeper at the ends than at the middle and that frame 43 has dimples at the four upper side corners of channel 19. See, for example, dimples 48, 49, and 47. This arrangement allows the user to press the ends of rods 15 and 16 slightly lower in the channel than at the middle of the rods. Resilient coatings 17 and 18 on rods 15 and 16 facilitate the pressing to take place.

Figure 8:
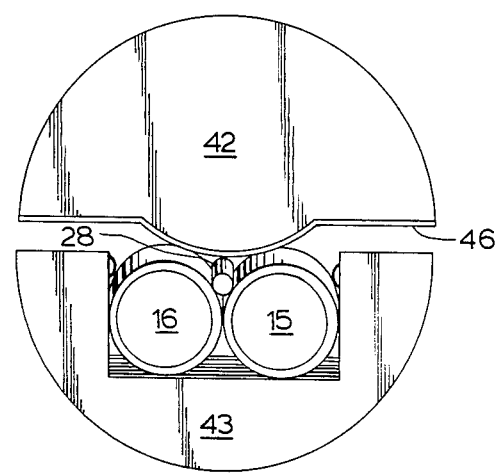
FIG. 8 is an end view of the assembled components of FIG. 7.

FIG. 8 shows an end view of the frame and lid of FIG. 7. Note optical fiber 28 is being pressed by the resilient coatings on rod 15, rod 16, and lid 42.

Figure 9:
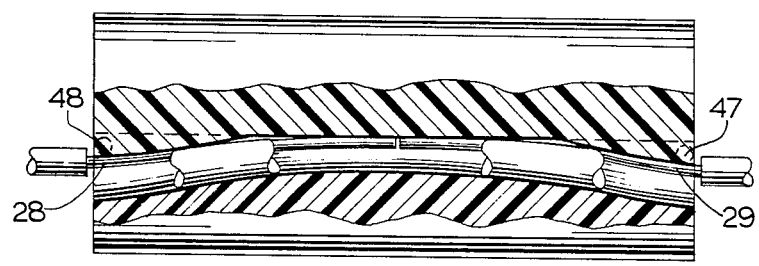
FIG. 9 is a side cutaway view of the assembled components of FIG. 7.

FIG. 9 shows a side cutaway view of a second embodiment. Note that the floor of the channel of frame 43 gently rises in the middle portion. The effect of this and dimples such as 47 and 48 allow the rods to be lower at the ends of the channel than at the middle, leaving space for entry of optical fibers 28 and 29. This space allows the elimination of the lid recesses contained in the earlier embodiment.

In use, the second embodiment is placed between resilient tubular members 22 and 23 within tubular housing 25 which is covered by the crimping sleeve 31, and crimped exactly as shown for the first embodiment. As only the frame and lid are changed in the second embodiment, those further elements need not be repetitiously described. In either embodiment the crimping sleeve may be secured by other means, including application of an epoxy or other adhesive.

Figure 19:
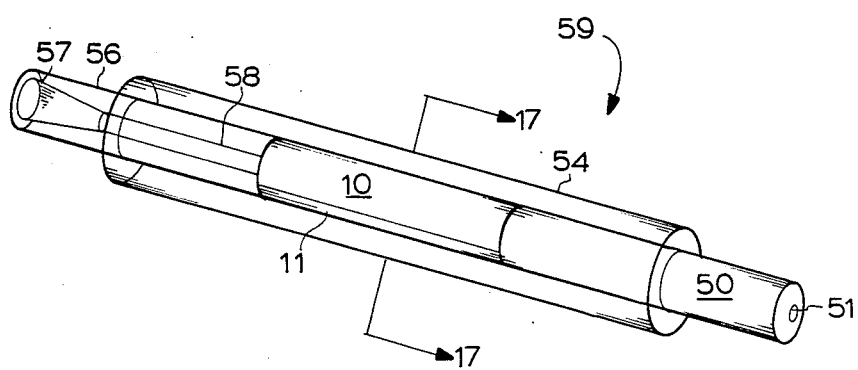

Another embodiment of the invention is shown in FIG. 19, element 22. It is composed of four basic elements:

(1) an outer tube 54;
(2) a ferrule 50 and optical fiber 15 combination;
(3) an alignment device (see elements 10, 11, 15, and 16) as previously described above (see, for example, FIG. 1, part of FIG. 2, FIG. 7, 8, or 9; and,
(4) a second tube 56.

The combination of elements shown in FIG. 19 is first assembled at a factory site and then affixed to a housing coupling device 64–65 combination like that shown in FIG. 21. The resulting combination 62 is then used in the field in making a job site connection by threading a terminal end portion of an optical fiber 60 into second tube 56 and pushing it into the groove created by rods 15 and 16 until it abuts against the free terminal end of optical fiber 52, at which time it is fixed in place by means of an adhesive, such as U-V curable epoxy or a crimping device.

Figure 10:
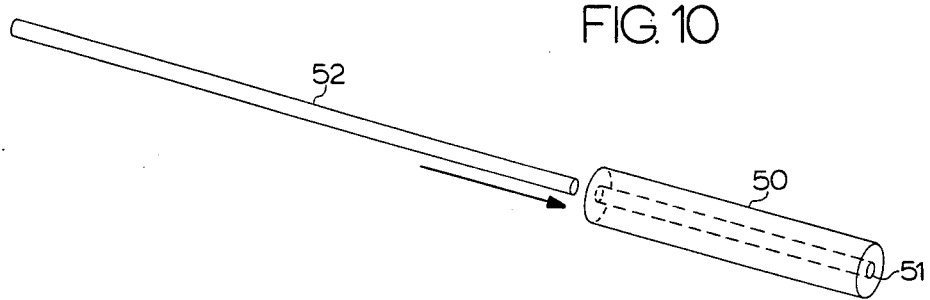
FIG. 10 is a perspective view of a ferrule and an optical fiber.
Figure 11:
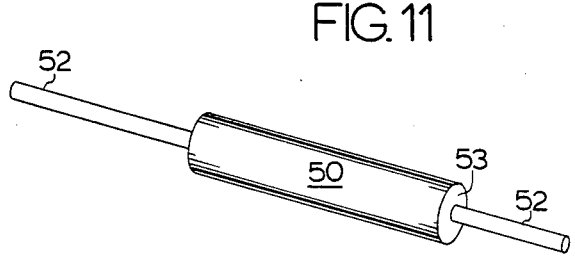
FIG. 11 is a perspective view of the combination of the elements of FIG. 10.
Figure 12:
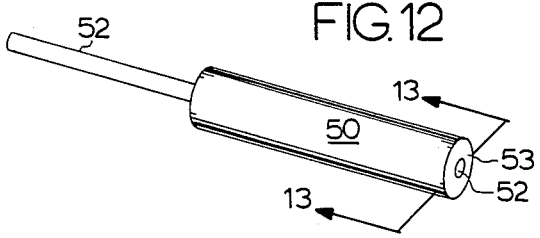
FIG. 12 is a perspective view of the combination of FIG. 11 with one free edge of the ferrule polished to a flat surface and to the ferrule.
Figure 13:
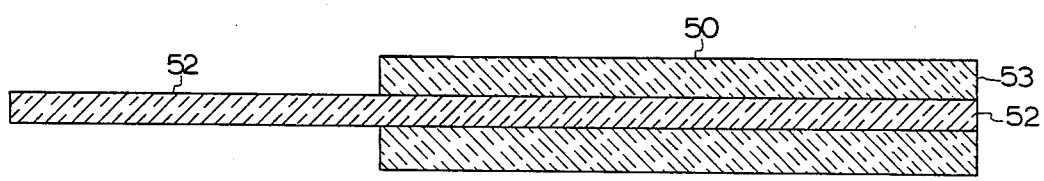
FIG. 13 is a cross sectional front elevation of the combination shown in FIG. 12 along lines 13—13.
Figure 14:
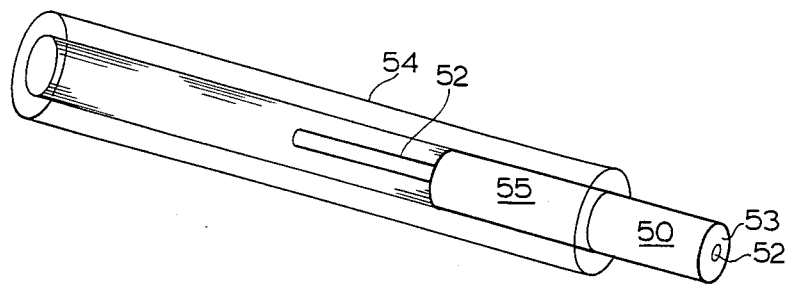
FIG. 14 is a perspective cutaway view of the ferrule optical fiber combination of FIGS. 12 and 13 inserted in a first tube.
Figure 15:
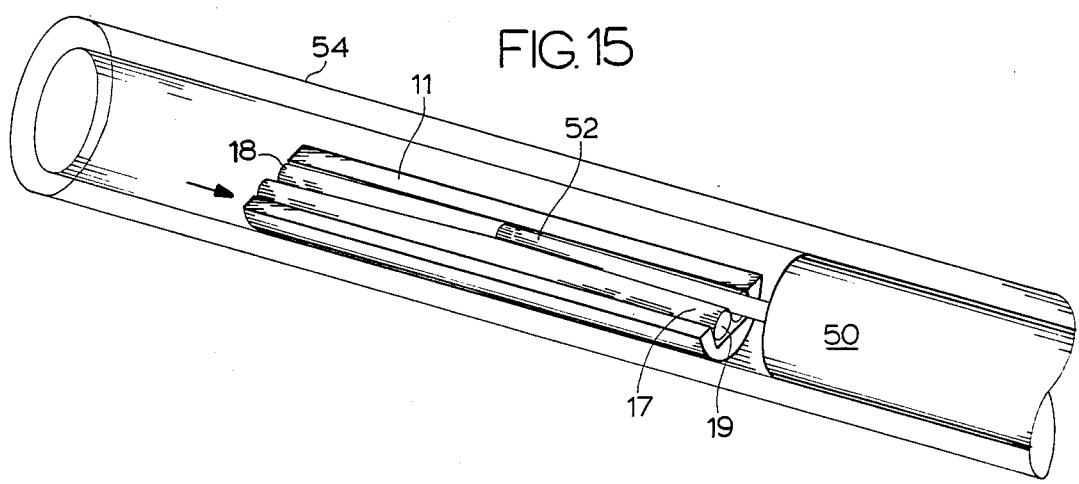
FIG. 15 is a perspective cutaway view of the combination of FIG. 14 plus an alignment device channel with rods.
Figure 16:
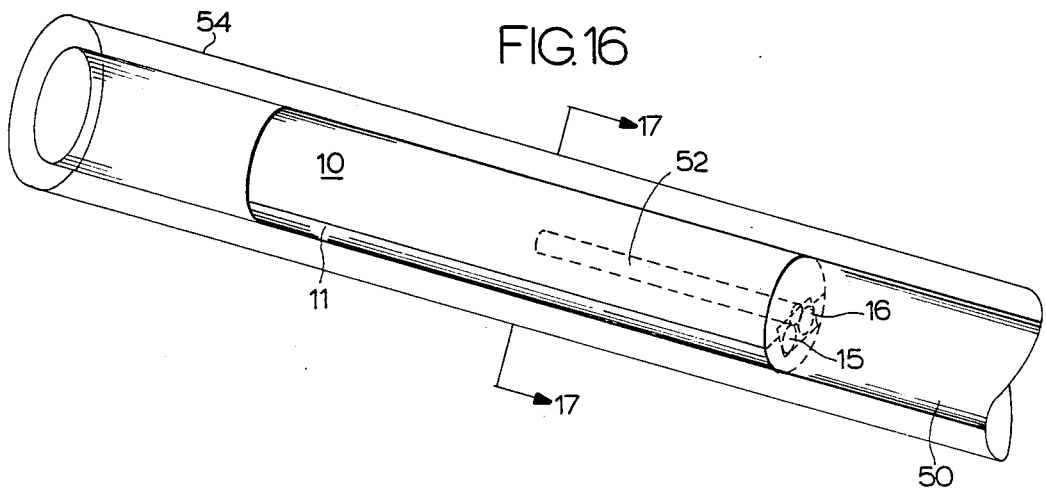
FIG. 16 is a perspective cutaway view of the combination of FIG. 15 plus a lid for the alignment device.
Figure 17:
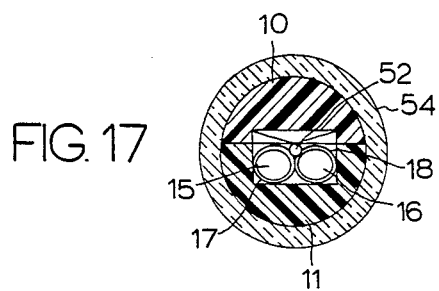
FIG. 17 is a cross-sectional view of the invention of FIGS. 16 and 19 along line 17—17.
Figure 18:
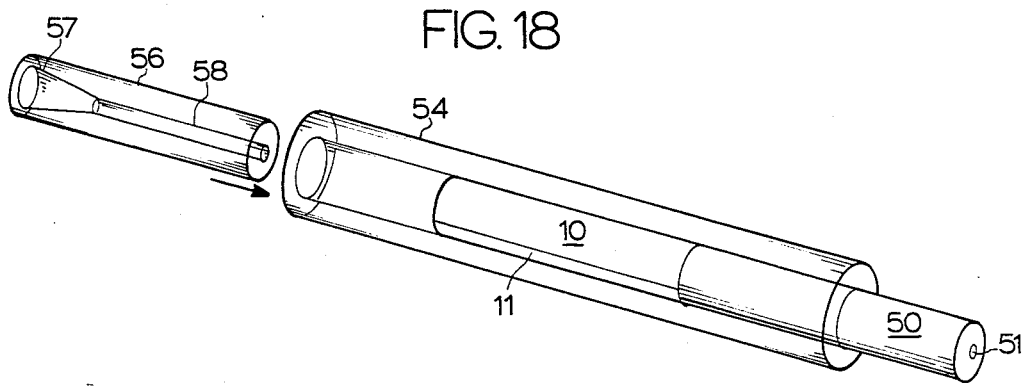
FIGS. 18 and 19 are perspective views of the combination of FIG. 16 with the addition of a second tube.

The procedure used to assemble 59 is as follows. Referring now to FIG. 10, ferrule 50, made of either glass, plastic, metal or ceramic, is threaded over optical fiber 52. Ferrule 50 has a channel 51 through it into which optical fiber 52 is threaded as shown in FIG. 11. Optical fiber 52 is then affixed to ferrule 50 by some well known adhesives such as U-V cured epoxy. Thereafter that portion of optical fiber 52 extending to the right of free edge 53 of ferrule 50 is ground off to create a polished terminal free edge 53 as shown in FIG. 12. A terminal portion of optical fiber 52 extends to the left as shown in this figure and in FIG. 13. The combination shown in FIGS. 12 and 13 is then inserted inside of tube 54 as shown in FIG. 14. Ferrule 50 and optical fiber 52 is then affixed to tube 54 at a location somewhere near 55 by a suitable adhesive such as U-V curable epoxy. Subsequently, channel 11, along with rods 15 and 16 coated with plastic 17 and 18 is disposed inside of tube 54 and the groove formed between rods 15 and 16 are partially occupied by fiber 52 (see FIG. 15 for example). Either embodiment shown in FIG. 1 or 7 could be used for channel 11, plus the rods and lids associated therewith. Subsequently, lid 10 is inserted into tube 54 covering the rods 15 and 16, as well as optical fiber 52 (see FIG. 16). A cross section of the assembly along line 17—17 has the appearance as that shown in FIG. 17.

The next step in assembly is the insertion of second tube 56 into first tube 54. It will be noted that second tube 56 has channel 58 running therethrough and a wide mouth entrance 57. Second tube 56 is inserted into first tube 54 to form combination 59. It will be noted that second tube 56 abuts against channel 11 and lid 10 and channel 11 and lid 10 abuts against ferrule 50. Second tube 56 obviously may be affixed to tube 54 by any suitable means such as a U-V curable epoxy. Channel 58, which communicates with wide mouth 57 of second tube 56, by its very nature has been found to coaxially align with the groove created by rods 15 and 16, more particularly that space occupied by optical fiber 52. Thus, when another optical fiber 60 is inserted into wide mouth 57 and thus through channel 58, it easily finds its way into that groove created by rods 15 and 16 and thus travels along that groove until it abuts against the terminal free edge of optical fiber 52. This is the step that is done in the field and an artisan need only to apply a quick curing epoxy adhesive to wide mouth 57 and optical fiber 60 inserted therein in order to affix optical fiber 60 to elements 59 in a permanent fashion. A prior art crimping device may be used instead.

Once element 59 has been completely assembled, a housing-coupling device is affixed to it in a manner well known in the art. Such a housing-coupling device is shown as element 64 and 65 in FIG. 21 and the combination of element 59 and housing-coupling device 64–65 creates one portion of a rematable connector. Element 62 may be mated as many times as desirable with a receiving device 63. Element 63 is well known in the prior art and the two elements, 62 and 63, are known in the prior art as an ST type connector. Element 64 of element 62 is a "boot" that circumferentially surrounds a portion of element 59 and is removably attachable to element 65 in a manner well known in the prior art. A field artisan to make a splice need only to thread boot 64 onto an optical fiber (usually a tight buffered optical fiber) with the tight buffered optical fiber stripped so that a terminal portion of the bare fiber 60 is exposed, insert bare fiber 60 into element 56 and into alignment device until its terminal free edge abuts against optical fiber 52, at which time the wide mouth portion of second tube 56 receives an epoxy adhesive to affix in place optical fiber 60 to second tube 56. A suitable crimping device may be used instead. Thereafter, boot 64 is then affixed to element 65 and the rematable splice 62 is ready to be removably engaged with receiving device 63.

What is claimed is:

1. A splice comprising:
   (a) a frame having a channel in lengthwise communication with an exterior surface of the frame;
   (b) two rigid rods beside each other in the channel of the frame delimiting a groove therebetween into which two optical fiber terminal end portions may be abutted one against the other, each rod having a resilient lengthwise coating thereon;
   (c) a lid at least partially covered by a resilient coating adapted to be in lengthwise contact with the two rigid coated rods when the lid is closed; and,
   (d) a device to compress the frame and the lid into mating relationship, said device comprising (i) a housing larger than the frame and lid placed around the frame and lid, the end portions of the housing extending beyond the frame and lid, and (ii) resilient tubular members nested within the housing on either end of the frame and lid.

2. The splice of claim 1, wherein the end portions of the housing have longitudinal slits therein.

3. The splice of claim 1, further comprising a mountable crimp sleeve disposed about the housing.

4. The splice of claim 3, wherein the crimping sleeve is crimped over the end portions of the housing.

5. The splice of claim 3, wherein the coated portion of the lid is flat.

6. The splice of claim 3, wherein the coated portion of the lid is curved.

7. The splice of claim 3, wherein the coated rods are in contact with one another.

8. The splice of claim 1, wherein each rod has a resilient lengthwise coating between 0.0015 and 0.004 inches thick and the resilient coating on the lid is between 0.0015 and 0.010 inches thick.

9. The splice of claim 1, further comprising a recess in an end of the lid coaxial with said groove, to facilitate entry of an optical fiber in the groove delimited by the coated rods.

10. The splice of claim 1, wherein the channel is rectangular in shape.

11. The splice of claim 1, wherein each of said rigid rods are glass rods.

12. The splice of claim 1, wherein the resilient coatings on the rods and lid have a thickness of 0.002 inches, plus or minus 0.0002 inches.

13. The splice of claim 11, wherein each of the glass rods are optical fibers.

14. An optical fiber splice comprising:
 (a) a frame having a channel in communication with an exterior surface of the frame;
 (b) two rigid coated rods beside each other in the channel delimiting a groove therebetween into which two optical fiber terminal end portions may be abutted, each coated rod having a lengthwise resilient coating thereon;
 (c) a lid at least partially covered by a resilient coating, said lid coating in contact with the two rigid coated rods when the lid is closed;
 (d) two optical fiber terminal end portions, in endwise abutting relationship with one another, disposed in the groove delimited by the coated roads; and,
 (e) a device to compress the frame and the lid into a mating relationship comprising (i) a housing longer than the frame and lid placed around the frame and lid, the end portions of the housing extending beyond the frame and lid; and, (ii) resilient tubular members nested within the housing on either end of the frame and lid.

15. The splice of claim 14 further comprising a recess in an end of the lid coaxial with said groove, to facilitate entry of an optical fiber into the groove delimited by the coated rods.

16. The splice of claim 14 wherein the channel is rectangular in shape.

17. The splice of claim 14, wherein each of said rigid rods are glass rods.

18. The splice of claim 14, wherein the resilient coatings on the rods and the lid have a thickness between 0.002 inches, plus or minus 0.0002 inches.

19. The splice of claim 17, wherein each of the glass rods are optical fibers.

20. The splice of claim 14, wherein the end portions of the housing have longitudinal slits therein.

21. The splice of claim 20, further comprising a malleable crimping sleeve disposed around the housing.

22. The splice of claim 21, wherein the crimping sleeve is crimped over the end portions of the housing.

23. The splice of claim 21, wherein the coated portion of the lid is flat.

24. The splice of claim 21, wherein the coated portion of the lid is curved.

25. The splice of claim 21, wherein the coated rods are in contact with one another.

26. A splice comprising:
 (a) a frame having a channel in lengthwise communication with an exterior surface of the frame;
 (b) two rigid rods beside each other in the channel delimiting a groove therebetween into which the two optical fiber terminal end portions may be abutted, each rod having a resilient lengthwise coating between 0.0015 and 0.004 inches thick; and,
 (c) a lid at least partially covered by a resilient coating between 0.0015 and 0.10 inches thick, said lid coating adapted to be in lengthwise contact with the two rigid coated rods when the lid is closed.

27. An optical fiber splice comprising:
 (a) a frame having a channel in communication with an exterior surface of the frame;
 (b) two rigid coated rods beside each other in the channel delimiting a groove therebetween into which two optical fiber terminal end portions may be abutted, each coated rod having a lengthwise resilient coating between 0.0015 and 0.10 inches thick;
 (c) a lid at least partly covered by a resilient coating between 0.0015 and 0.004 inches thick, said lid coating in contact with the two rigid coated rods when the lid is closed; and,
 (d) two optical fiber terminal end portions in endwise abutting relationship with one another disposed in the groove delimited by the coated rods.

28. A splicing assembly comprising:
 (a) a first tube;
 (b) a ferrule and an optical fiber, said optical fiber having first and second portions, said optical fiber first portion disposed inside of and affixed to said ferrule and said optical fiber second portion lying outside of said ferrule and inside of said first tube and a portion of said ferrule disposed inside of and affixed to said first tube; and,
 (c) an alignment device and a second tube, both of which are disposed in said first tube, wherein the alignment device includes:
  (i) a frame having a channel in lengthwise communication with an exterior surface of said frame;
  (ii) two rigid rods lying beside each other in said channel delimiting a groove therebetween which is in part occupied by said optical fiber second end portion; and,
  (iii) a lid covering said rigid rods.

29. The splicing assembly of claim 28 wherein a part of said second tube is affixed to said first tube.

30. The splicing assembly of claim 28 wherein each rod has a resilient lengthwise coating between 0.0015 and 0.004 inches thick and said lid covering said rods is at least partially covered by a resilient coating between 0.0015 and 0.010 inches thick.

31. The splicing assembly of claim 28 further including a housing coupling device affixed to said ferrule, said housing-coupling device adapted to be removably coupled to a receiving device.

32. An optical splice comprising:
 (a) a first tube;
 (b) a ferrule and an optical fiber, said optical fiber having first and second portions, said optical fiber first portion disposed inside of and affixed to said ferrule and said optical fiber second portion lying outside of the ferrule and inside of said first tube and a portion of said ferrule disposed inside of and affixed to said first tube;
 (c) an alignment device and a second tube, both of which are disposed in said first tube wherein said alignment device includes:
  (i) a frame having a channel in lengthwise communication with an exterior surface of the frame;
  (ii) two rigid rods lying beside each other in the channel delimiting a groove therebetween which is in part occupied by said optical fiber second end portion; and,
  (iii) a lid covering said rigid rods; and,
 (d) a housing-coupling device affixed to said first tube, said housing-coupling device adapted to be removably coupled to a receiving device.

33. The optical splice of claim 30 wherein each rod has a resilient lengthwise coating between 0.0015 and 0.004 inches thick and said lid covering said rods is at least partially covered by a resilient coating between 0.0015 and 0.010 inches thick.

34. The optical splice of claim 30 wherein said terminal end portion of said other optical fiber occupies a part of said groove between said rigid rods.

* * * * *